United States Patent [19]

Davidovits

[11] Patent Number: 5,288,321

[45] Date of Patent: Feb. 22, 1994

[54] METHOD FOR ELIMINATING THE ALKALI-AGGREGATE REACTION IN CONCRETES AND CEMENT THEREBY OBTAINED

[76] Inventor: Joseph Davidovits, 16 rue Galilée, Saint Quentin, F-02100, France

[21] Appl. No.: 916,003

[22] PCT Filed: Jan. 8, 1991

[86] PCT No.: PCT/FR91/00007

§ 371 Date: Jul. 29, 1992

§ 102(e) Date: Jul. 29, 1992

[87] PCT Pub. No.: WO91/11405

PCT Pub. Date: Aug. 8, 1991

[30] Foreign Application Priority Data

Feb. 5, 1990 [FR] France .................. 90 01278

[51] Int. Cl.$^5$ ............................................. C04B 7/36
[52] U.S. Cl. .................................. 106/713; 106/739; 106/746
[58] Field of Search ......................... 106/713, 739, 746

[56] References Cited

PUBLICATIONS

S. Komarneni et al, "Selective Cation Exchange . . . Tobermorites", J. Am. Ceram. Soc. 72, 1668-74 (1989).
J. Davidovits, "Structural Characterization of Geopolymeric . . . Spectroscopy", Geopolymer '88, vo. 2, pp. 149-166, Universite de Technologie, Compiegne, France. (1988).
J. Skibsted, "High-Speed 29SiAND 27Al MAS NMR . . . Cements", Geopolymer '88, vol. 2, pp. 179-196, Universite de Technologie, Compiegne France (1988).
M. Regourd, "Microanalytical Studies (X-Ray Photoelectron Spectrometry) . . . Compounds", Phil. Trans. R. Soc. Lond. A 310, 85-92 (1983).
J. F. Young, "Investigations of Calcium Silicate Hydrate Structure . . . Resonance Spectroscopy", J. Am. Ceram. Soc., 71, C-118-120 (1988).
J. Sang et al, "Aluminum-27 abd Silico-29 Magic-Angle . . . Transformation", J. Am. Ceram. Soc., 71[10], C418-C421 (1988).

Proceedings of the 3rd International Conference, Table of Contents (1989).

*Primary Examiner*—Karl Group
*Assistant Examiner*—Paul Marcantoni
*Attorney, Agent, or Firm*—Browdy and Neimark

[57] ABSTRACT

Method for eliminating the dangerous alkali-aggregate reaction in concretes which contain hydrated cement obtained by the alkaline activation of Portland cement. The formation in this concrete of a compound which can generate a soluble alkali aluminate is prevented by reacting a mineral composition by alkaline activation, the said compound consisting of a hydrated aluminosilicate whose Nuclear Magnetic Resonance $^{27}$Al MAS-NMR spectrum shows a resonance at 66±5 ppm corresponding to a $(Q_3)(3Si)$-type $(AlO_4)$ tetrahedron. The above-mentioned mineral composition contains:

a) 100 parts by weight of the said calcium aluminosilicate;
b) 10 to 30 parts by weight of powdered synthetic alumino-silicate belonging to the class of silicates whose mineralogical structure is lamellar and whose MAS-NMR for $^{27}$Al has at least one main resonance at 20±5 ppm and/or 50±5 ppm in relation to $AlCl_3$.
c) 0 to 10 parts by weight of a hydrated disilicate $Ca(H_3SiO_4)_2$ whose $(SiO_4)$ tetrahedron polymerization degree is $(Q_1)$ as determined by the value of the MAS-NMR spectrum for $^{29}$Si.

The mineral composition is a rapid-set geopolymeric cement characterized after alkaline activation by its $^{27}$Al MAS-NMR spectrum which shows a resonance at 55±5 ppm in relation to $AlCl_3$, corresponding to a $(Q_4)(4Si)$-type $(AlO_4)$ tetrahedron, and a resonance at 0±5 ppm in relation to $AlCl_3$, corresponding to Al in VI-fold coordination $(AlO_6)$ in aluminum hydroxide and/or hydrated calcium sulfo-aluminate (ettringite). The ratio $(AlO_4)(4Si)/(AlO_6)$ between the intensity of the $(Q_4)(4Si)$-type $(AlO_4)$ resonance at 55±5 ppm and the intensity of the $(AlO_6)$ resonance at 0 ppm is equal to or between 0.1 and 1.

6 Claims, No Drawings

METHOD FOR ELIMINATING THE ALKALI-AGGREGATE REACTION IN CONCRETES AND CEMENT THEREBY OBTAINED

The present invention concerns a method for eliminating the dangerous alkali-aggregate reaction in concretes. More specifically the mineral compounds described in this invention enable the production of a rapid-set geopolymeric cement comprising portland cement and alkali activation, the said geopolymeric cement preventing the formation in these concretes of a compound which can generate a soluble alkali aluminate, responsible for the deleterious alkali-aggregate reaction.

The accelerating properties of small quantities of alkali salts or of alkali hydroxides on the setting of ordinary hydraulic binders are well known. This particular setting or hardening acceleration of cement, is often called alkali activation. However, several drawbacks have limited its applications, for example the attack and destruction of concrete due to alkali-aggregate reaction. The present invention provides a remedy to these failures and enables advantage to be taken of the alkali activation properties without the said drawbacks.

In the present invention, alkali activation is performed with alkali salts, sodium and/or potassium carbonates, soluble alkali silicates or sodium and/or potassium hydroxides; in the resulting mineral composition, the amount of the said alkali ingredients involves an oxide molar ratio $[M_2O]/[SiO_2]<0,1$, equivalent to the oxide weight ratio $M2O/SiO2<0,15$; in a preferred description of the invention, M is potassium and alkali activation is carried out with potassium carbonate. Any worker in the field knows about the rapid-set accelerating properties of potassium carbonate and the necessity of adding citric acid or potassium citrate in order to prevent any flash-set of cement.

To differentiate the cements described in the present invention from traditional alkali activated cements, the investigation tool used is Nuclear Magnetic Resonance spectroscopy (MAS-NMR). MAS-NMR spectra for geopolymers and hydraulic binders are disclosed in the publication Geopolymer '88, Volume 2, pages 149-197, published by the Geopolymer Institute, Université de Technologie, Compiègne, France. MAS-NMR spectrography for $^{27}Al$ for products yielded by a geopolymeric reaction show a single peak at $55\pm5$ ppm, characteristic of Al(IV) coordination and a tetrahedron (AlO$_4$) of the Q$_4$(4Si) type, whereas the hydration products obtained with traditional hydraulic binders show a peak at 0 ppm, characteristic of Al(VI) coordination, i.e. of the hydroxy-aluminate of calcium.

In this invention, the portland cement based geopolymeric mineral compositions yielding a rapid-set geopolymeric cement after alkali activation $[M_2O]/[SiO_2]<0,1$, comprise essentially three reactive constituents:

a) 5 to 10 parts by weight of a basic calcium aluminosilicate $x(CaO).y(Al_2O_3).(SiO_2)$, where "x" has a value between 2 and 3.5 and "y" has a value between 0 and 0.2, whose (SiO$_4$) tetrahedron polymerization degree is (Q$_1$) as determined by the MAS-NMR spectrum for $^{29}Si$, and whose MAS-NMR spectrum for $^{27}Al$ has a main resonance equal to $75\pm5$ ppm in relation to AlCl$_3$ corresponding to a Q$_0$(0Si)-type (AlO$_4$) tetrahedron.

b) 0 to 3 parts by weight of a synthetic alumino-silicate belonging to the class of silicates whose mineralogical structure is lamellar and whose MAS-NMR for $^{27}Al$ has at least one main resonance at $20\pm5$ ppm and/or $50\pm5$ ppm in relation to AlCl$_3$.

c) 0 to 2 parts by weight of a hydrated disilicate Ca(H$_3$SiO$_4$)$_2$ whose (SiO$_4$) tetrahedron polymerization degree is (Q1) as determined by the value of the MAS-NMR spectrum for $^{29}Si$.

The inorganic compositions of the invention are also called inorganic geopolymeric compositions, since the geopolymeric cement obtained has resulted from an inorganic polycondensation reaction, a so-called geopolymerisation, unlike traditional hydraulic binders in which hardening is the result of the hydration of aluminates of calcium and silicates of calcium.

MAS-NMR spectrography of $^{29}Si$ also shows a very clear difference between geopolymers and hydraulic binders. If the degree of polymerisation of SiO$_4$ tetrahedron is represented by $Q_n$ (n=0,1,2,3,4), distinction can be made between monosilicates (Q$_0$), disilicates (Q$_1$), linear silicate chains (Q$_2$), grafted silicates (Q$_3$) and silicates forming a three-dimensional lattice (Q$_4$). These various degrees of polymerisation are characterised in MAS-NMR spectrography of $^{29}Si$ by the following peaks: (Q$_0$) from $-68$ to $-77$ ppm; (Q$_1$) from $-78$ to $80$; (Q$_2$) from $-80$ to $-85$; (Q$_3$) from $-85$ to $-90$; Q$_4$ from $-91$ to $-130$ ppm. The peaks which characterise the geopolymers occur in the region $-85$ to $-100$ ppm and correspond to the three-dimensional lattice (Q$_4$) which is characteristic of the poly(sialates) and poly(sialate-siloxo). On the other hand, hydration of hydraulic binders yielding hydrated calcium silicate C—S—H (according to the terminology used in cement chemistry), produces peaks in the region $-68$ to $-85$ ppm attributable either to the monosilicate (Q$_0$) or the disilicates (Q$_1$)(Q$_2$); (see for example J. Hjorth, *Cement and Concrete Research*, vol. 18 No. 4, 1988; see also J. F. Young, *J. Am. Ceram. Soc.*, 71 (3), C-118 (1988).

There have been proposed in the past binders and cements developing rapid-set accelerating properties with alkali. Thus for example the patents Forss, U.S. Pat. No. 4,306,912, Heitzmann & al., U.S. Pat. No. 4,640,715/U.S. Pat. No. 4,642,137/U.S. Pat. No. 4,842,649/WO 89/02878, Gouvenot U.S. Pat. No. 4,514,228, Davidovits & al. U.S. Pat. No. 4,472,199, and Shinetsu JP 61-155239. In some patents the molar ratio $[M_2O]/[SiO_2]$ is greater than 0.1, generally ranging between 0.20 and 0.50, such as in the patents U.S. Pat. No. 4,472,199, U.S. Pat. No. 4,640,715, U.S. Pat. No. 4,642,137. They are not related to the present invention. In others, for instance U.S. Pat. No. 4,306,912, U.S. Pat. No. 4,842,649, U.S. Pat. No. 4,514,228 and JP 61-155239, the alkali activation of the portland cement-based hydraulic binders is of the $[M_2O]/[SiO_2]<0,1$-type, basically carried out by adding 0-3% by weight of potassium carbonate and 0-3% by weight of citric acid (or potassium citrate).

It is well known that, from a chemical point of view, the alkali activation $[M_2O]/[SiO_2]<0,1$ of hydraulic binders comprising portland cement or blast-furnace slags generates CSH-type hydrated calcium silicates, with some substitutions by alkaline ions and aluminum. In these hydrates, alkaline ions, linked with weak ionic bonds, may very easily migrate and chemically react with silicic aggregates, causing expansion and destruction of the concrete. This alkali aggregate reaction and the remedies proposed by the prior art are well documented, for instance in the *Proceedings of the 3rd International Conference*, Trondheim, Norway, 1989, "Fly Ash, Silica Fume, Slag and Natural Pozzolans in Concrete", SP-114, Volume 1 and 2, American Concrete Institute ACI. However, the prior art does not provide precise physico-chemical laws aimed at preventing any alkali-aggregate reaction. The results are contradictory and not reproducible, and the general trend in the cement industry consists in supplying portland cements which contain the lowest possible amount of alkali and, of course, in refraining from any use of alkali activation.

The chemical nature of these hydrates CSH has been determined through their MAS-NMR spectra. From the study published by Komarneni and al. in *J. Am. Ceram. Soc*, 72, 1668–74 (1989) and in *Cement and Concrete Research* 15, 723–728 (1985), it can be deduced that alkali activation of a basic calcium alumino-silicate $x(CaO).y(Al_2O_3).(SiO_2)$, where "x" has a value between 2 and 3.5 and "y" has a value between 0 and 0.2, generates the production of a chemical compound having a structure close to that of substituted tobermorite, whose MAS-NMR spectrum for $^{27}Al$ shows a main resonance at 64 ppm, corresponding to a $Q_3(3Si)$-type $(AlO_4)$ tetrahedron, whereas the MAS-NMR spectrum for $^{29}Si$ shows for the $(SiO_4)$ tetrahedron polymerisation degrees of the $(Q_2)(0Al)$, $(Q_2)(1Al)$, $(Q_3)(0Al)$, $(Q_3)(1Al)$-types. In this type of chemical structure, the alkali hydrates, more precisely the potassium and sodium aluminates $AlOH-Na^+$, $AlOH-K^+$, are free and therefore subject to acidic attack and can also react with silicic aggregates.

The chemical compound, which is related to the alkali activation of portland cement, shows a $^{27}Al$ MAS-NMR resonance at 64–66 ppm corresponding to a $(Q_3)(3Si)$-type $(AlO_4)$ tetrahedron, characteristic for a hydrated alkali alumino-silicate with a non tri-dimensional structure. The intensity of the $^{27}Al$ MAS-NMR resonance at 64–66 ppm increases with the amount of alkali available in the mix. This compound generates the production of soluble alkali aluminates which cause the deleterious alkali-aggregate reaction. In the prior art of Shinetsu JP 61.15239, for instance, the addition to the mix of calcium aluminate which reacts ionically with potassium carbonate, enhances the production of soluble alkali aluminate. In other words, the compositions claimed in Shinetsu patent do not reduce the dangerous alkali-aggregate reaction in concretes, but rather increase it.

In contrast, the method disclosed in this invention does not produce any free alkali aluminates, but yields the synthesis of a tri-dimensional geopolymeric compound whose $^{27}Al$ MAS-NMR spectrum shows a main resonance at 55±5 ppm in relation to $AlCl_3$ which corresponds to a $(Q_4)(4Si)$-type $(AlO_4)$ tetrahedron and is basically different from the compound obtained during the alkali activation of portland cement.

The inventor was surprised to realise that the change in the $^{27}Al$ MAS-NMR spectrum, namely the shift from the 66±5ppm resonance to the 55±5ppm resonance, resulted from the addition in the mineral mix, of a synthetic alumino-silicate whose MAS-NMR for $^{27}Al$ has at least one main resonance at 20±5ppm and/or 50±5ppm. Alumino-silicates providing such MAS-NMR spectrum belong basically to the class of those having a lamellar mineralogical structure. Those disclosed in the preferred examples of this invention are either the alumino-silicate oxide $\{9[Si_2O_5,Al_2O_2],[Si_2O_5,Al_2(OH)_4]\}$ which is produced by calcination of a kaolinitic material, or a glass containing an alumino-silicate oxide $2CaO.Al_2O_3.SiO_2$, belonging to the mineralogical family of gehlinite, produced by vitrifying clays.

One of the objects of the present invention concerns a method enabling the production of a portland based rapid-set cement, whose $^{27}Al$ MAS-NMR spectrum shows a main resonance at 55±5 ppm corresponding to a $(Q_4)(4Si)$-type $(AlO_4)$ tetrahedron. The said rapid-set cement results from alkali activation $[M_2O]/[SiO_2]<0,1$ of a basic calcium alumino-silicate $x(CaO).y(Al_2O_3).(SiO_2)$, where "x" has a value between 2 and 3.5 and "y" has a value between 0 and 0.2. The production of a cement which contains a hydrated alumino-silicate, whose $^{27}Al$ MAS-NMR spectrum shows a resonance at 64–66 ppm corresponding to a $(Q_3)(3Si)$-type $(AlO_4)$ tetrahedron, is prevented by the reaction of a mineral composition comprising:

a) 100 parts by weight of the said calcium alumino-silicate;
b) 10 to 30 parts by weight of a synthetic alumino-silicate belonging to the class of silicates whose mineralogical structure is lamellar and whose MAS-NMR for $^{27}Al$ has at least one main resonance at 20±5 ppm and/or 50±5 ppm in relation to $AlCl_3$.
c) 0 to 10 parts by weight of a hydrated disilicate $Ca(H_3SiO_4)_2$ whose $(SiO_4)$ tetrahedron polymerization degree is $(Q_1)$ as determined by the value of the MAS-NMR spectrum for $^{29}Si$.

The quantities of alkali added to initiate alkali activation are too low to transform all the calcium aluminate available in portland cement, into an alkali alumino-silicate, whose $^{27}Al$ MAS-NMR spectrum shows a main resonance at 55±5 ppm, corresponding to a $(Q_4)(4Si)$-type $(AlO_4)$ tetrahedron. The calcium alumino-silicate part in excess, not activated by the alkalis, is normally transformed into aluminum hydroxide and/or hydrated calcium sulfoaluminate. Consequently, the MAS-NMR spectrum of the hydrated calcium aluminate is also displayed with the previous spectrum; accordingly, the rapid-set geopolymeric cement of the present invention has a $^{27}Al$ MAS-NMR spectrum which shows a resonance at 55±5 ppm in relation to $AlCl_3$ corresponding to a $(Q_4)(4Si)$-type $(AlO_4)$ tetrahedron and also a resonance at 0±5 ppm in relation to $AlCl_3$ corresponding to the cation Al in VI-fold coordination $(AlO_6)$ of aluminum hydroxide and/or hydrated calcium sulfo-aluminate (ettringite), with a ratio between the resonance intensity $(Q_4)(4Si)$-type $(AlO_4)$ at 55±5 ppm and the resonance intensity $(AlO_6)$ at 0±5 ppm, $(AlO_4)/(AlO_6)$ equal to or between 0.1 and 1.

When the said synthetic alumino-silicate corresponds to the alumino-silicate oxide $\{9[Si_2O_5,Al_2O_2],[Si_2O_5,Al_2(OH)_4]\}$, produced by calcining kaolinitic materials, the said calcination must be carried out in such ways that the $^{27}Al$ MAS-NMR spectrum for the said alumino-silicate oxide displays two main resonances at 20±5 ppm and 50±5 ppm and an additional secondary resonance, with lower intensity, at 0±5 ppm in relation to $AlCl_3$.

In this respect, calcination parameters do determine the efficiency of the alumino-silicate oxide in relation to the claims of the present invention. For instance, when calcination is carried out at a temperature between 550° C. and 650° C., the main resonance of the $^{27}Al$ MAS-NMR spectrum is 0±5 ppm, highlighting a deficit in (IV-V)-coordinated Al. On the other hand, when calcination is carried out at a temperature higher than 900°

C., the main resonance of the $^{27}$Al MAS-NMR spectrum is also 0±5 ppm, highlighting accordingly a deficit in (IV-V)-coordinated Al. With higher calcination temperature (1000° C.–1100° C.) the calcined material comprises more mullite whose main resonance of the $^{27}$Al MAS-NMR spectrum is also 0±5 ppm.

Ideal calcination temperatures are between 700° C. and 800° C. However, in addition to temperature control, it is the kiln technology which determines the feasibility and production of the alumino-silicate oxide {9[Si$_2$O$_5$,Al$_2$O$_2$],[Si$_2$O$_5$,Al$_2$(OH)$_4$]} described in the present invention. When calcination is carried out in a rigid (vertical) kiln, a sufficient water vapor pressure is maintained during the entire roasting process, providing the desired MAS-NMR spectrum for the roasted material. In direct contrast, rapid calcination in rotary kilns currently employed in cement plants, yields a deficit in (IV-V)-coordinated Al.

In general, industrial products which are called low-temperature calcined kaolins or high-temperature calcined kaolins, in use in the paper industry, commonly called metakaolin, do not react in the terms of the present invention, for the reasons explained hereabove. This is also the case for metakaolins manufactured in a rapid roasting rotary kiln by cement producers, which for example in the description of Heitzmann & al. patent U.S. Pat. No. 4,842,649, are characterised by the US codification ASTM C618-85 dedicated to calcined natural pozzolanic materials.

The formulations described in the patent of Heitzmann, U.S. Pat. No. 4,842,649, are essentially designed to facilitate hardening of portland cement at temperatures lower than 0° C.; it is claimed that metakaolin is related to potassium carbonate based upon the formula: 1 part potassium carbonate + ½ parts metakaolin = 2 parts potassium carbonate, in other words metakaolin may replace potassium carbonate. However, even if potassium carbonate plays the main role in alkali activation, this does not mean that metakaolin does possess any alkali group. It is chemically neutral.

According to the patent Heitzmann U.S. Pat. No. 4,842,649, we learn that metakaolin enhances the activity of potassium carbonate. Yet, as it is known that, in the cold, the solubility of potassium carbonate is slowed down, any use of metakaolin would, in terms of this patent and at these low temperatures, increase the solubility of potassium carbonate, in fact that of the potassium ion.

In terms of Heitzmann's patent, any free exchange of potassium ions from complexes built into the reactive mix, requires that the major part of the Aluminum, in metakaolin, is in the (AlO$_6$)-type VI-fold coordination, with its typical resonance at the 0±5 ppm, and involves either a calcination temperature lower than 650° C. or calcination in a rotary kiln, during a very short time. This leads one to conclude that the metakaolin used in the formulations disclosed by Heitzmann do not correspond to the alumino-silicate oxide {9[Si$_2$O$_5$,Al$_2$O$_2$],[Si$_2$O$_5$,Al$_2$(OH)$_4$]} claimed in the present invention.

This is also the case for industrial by-products, such as alumino-silicates known as fly-ashes (by-products of the firing of coal) which do not possess the properties required by the present invention. The main element of these vitrified fly-ashes is mullite. It is known that, in mullite, aluminum is mainly in the (AlO$_6$)-type VI-fold coordination with its typical resonance at the 0±5 ppm, and in a IV-fold coordination related to a resonance at 60 ppm, both resonances being different to those claimed in the present invention. In addition, the mineralogical structure of mullite does not belong to the group of lamellar silicates.

These types of fly-ashes are generally employed in the prior art, for example in the patent of Forss. According to US designation, these fly-ashes are defined as Class F, and according to ISO codification as low CaO fly-ashes. However, the patent of Heitzmann recommends the use of Class C, or high CaO, fly-ashes.

What is claimed in U.S. Pat. No. 4,842,649 is a method for hardening at very low temperature which implies that at these temperatures the solubilization of the chemical ingredients is optimal. The admixture generally added to potassium carbonate is citric acid. At normal temperature, citric acid and potassium carbonate react to produce potassium citrate. However, it is known that potassium citrate is weakly soluble in cold solutions, whereas calcium citrate is more soluble in cold than in hot solutions. The high-CaO fly-ashes used in the patent of Heitzmann contain mainly free lime CaO which enhances the production of the more soluble calcium citrate. From this property, it can be deduced that the calcination temperature of the fly-ashes was in the range of 950° C.–1100° C. In addition, from the prior art, namely the paper SP114-19, American Concrete Institute, discussed above, it is known that Class C fly-ashes are precisely those fly-ashes which are the most dangerous, in terms of the alkali-aggregate reaction.

There exists another synthetic alumino-silicate which belongs to the class of silicates with a lamellar mineralogical structure, whose mineralogical structure is lamellar and whose MAS-NMR spectrum for $^{27}$Al has at least one main resonance at 20±5 ppm and/or 50±5 ppm in relation to AlCl$_3$; this is the calcium alumino-silicate gehlinite, 2CaO.Al$_2$O$_3$.SiO$_2$.

The production of calcium alumino-silicate gehlinite results essentially from the vitrification of clay material, and is carried out in such a way that, in the obtained glass, the said calcium alumino-silicate shows a MAS-NMR spectrum for $^{27}$Al with one main resonance at 45±7 ppm in relation to AlCl$_3$.

Its reactivity is not clearly understood, but it seems obvious that it is related to the property provided by certain glasses containing this calcium alumino-silicate of reacting with alkali, and producing the third reagent required for the present invention, namely calcium disilicate Ca(H$_3$SiO$_4$)$_2$.

Calcium disilicate, Ca(H$_3$SiO$_4$)$_2$, can be manufactured separately, for example by hydrothermal reaction between lime and silica.

However, according to a method preferred in the invention, it is produced in a naissant state in the binder after addition of the water required for solubilising the various powder reagents. The starting material is a basic calcium silicate, i.e. with a Ca/Si atomic ratio equal to or greater than 1. Basic silicates, such as wollastonite, Ca(SiO$_3$), gehlinite, (2CaO.Al$_2$O$_3$.SiO$_2$), akermanite, (2CaO.MgO.2SiO$_2$) are well suited. When the particles of these substances come into contact with an alkaline solution (NaOH or KOH), very rapid desorption of CaO occurs, so that the Ca/Si atomic ratio becomes lower than 1 and tends to 0.5 for basic silicates of initial ratio Ca/Si equal to or less than 2, such as wollastonite, gehlinite, akermanite.

It is essentially characterised by its ability to generate, under alkaline attack, a weakly basic calcium silicate, i.e. one having a Ca/Si atomic ratio = 0.5, i.e. precisely the calcium disilicate $Ca(H_3SiO_4)_2$. This characterisation is established using X-ray photoelectronic spectrometry (XPS), and by determination of the $Ca_{2p}/Si_{2p}$ ratios, as indicated by M. Regourd, *Phil. Trans. Royal Society*, London, A.310, pages 85-92 (1983). This very uniform process is carried out in 30 minutes at room temperature.

It has been assumed that this calcium disilicate $Ca(H_3SiO_4)_2$ reacts with the alkali aluminate generated by the basic calcium alumino-silicate $x(CaO).y(Al_2O_3).(SiO_2)$, with the formation of geopolymeric bonds of the poly(sialate-siloxo)-type (—Si—O—Al—O—Si—O—), and the production of a geopolymeric tridimensional framework where the $^{27}Al$ MAS-NMR spectrum shows a main resonance at 55±5 ppm in relation to $AlCl_3$ which corresponds to a $(Q_4)(4Si)$-type $(AlO_4)$ tetrahedron.

The industrial by-products and glasses which contain the calcium alumino-silicates discussed previously, include blast-furnace slag. However, according to the papers SP114-16 (American Concrete Institute) outlined hereabove, when the amount of blast-furnace slag to portland cement is less than 40-45% by weight, there is an increase in the danger with respect to the alkali-aggregate reaction. In contrast, in the terms of the present invention and even though the quantities of these industrial by-products are lower than 30% by weight of portland cement, there is elimination of the dangerous alkali-aggregate reaction.

Some bottom-ashes, obtained by firing coals at a very high temperature, with a firing temperature being high enough to completely vitrify the ashes, do not contain any free lime CaO.

In the terms of the present invention, these industrial by-products are essentially selected by comparing their $^{27}Al$ MAS-NMR spectra which must display at least one main resonance at 20±5 ppm and/or 50±5 ppm in relation to $AlCl_3$.

The formulations disclosed within the terms of the present invention may also comprise any additives and fillers commonly in usage with regular hydraulic binders.

The following examples are illustrative of the present invention. They in no way reflect a limit on the overall scope of the invention as set out in the claims. All parts are by weight.

EXAMPLE 1

The basic calcium alumino-silicate $x(CaO).y(Al_2O_3).(SiO_2)$ is a portland cement which has the following analysis:

| | |
|---|---|
| CaO | 63.25 |
| $SiO_2$ | 21.84 |
| $Fe_2O_3$ | 2.48 |
| $Al_2O_3$ | 4.34 |
| Mgo | 2.53 |
| $SO_3$ | 2.27 |
| $TiO_2$ | 0.25 |
| $P_2O_5$ | 0.12 |
| $K_2O$ | 0.89 |
| $Na_2O$ | 0.26 |

The cement has the following Nuclear Magnetic Resonance spectra:

$^{27}Al$ MAS-NMR: main resonance at 75 pmm in relation to $AlCl_3$, corresponding to a $(Q_0)(OSi)$-type $(AlO_4)$ tetrahedron.

$^{29}Si$ MAS-NMR: main resonance at −77 ppm in relation to TMS, corresponding to a polymerisation degree for the $(SiO_4)$ tetrahedron equal to $(Q_0)$.

A powder blend is prepared consisting of:
100 parts of this portland cement
2.5 parts of citric acid
2.5 parts of potassium carbonate.

A standard sand mortar is prepared employing this blend, with a cement/water ratio equal to 0.28. This mortar sets after 30 minutes and has a compressive strength of 21 MPa after 4 hours and 40 MPa after 24 hours, at room temperature.

The hardened mortar has the following Nuclear Magnetic Resonance spectra:

$^{27}Al$ MAS-NMR: main resonance at 66 pmm, corresponding to a $(Q_3)(3Si)$-type $(AlO_4)$ tetrahedron, and a resonance at 0 ppm corresponding to Al in VI-fold coordination $(AlO_6)$ in aluminum hydroxide and/or hydrated calcium sulfo-aluminate (ettringite).

$^{29}Si$ MAS-NMR: resonances ranging from −68 to −85 ppm corresponding to the monosilicate $(Q_0)$ and the disilicates $(Q_1)(Q_2)$.

EXAMPLE 2

A blend is prepared consisting of
100 parts of the cement of Example 1
2.5 parts of citric acid
2.5 parts of potassium carbonate.
6 parts of synthetic alumino-silicate $\{9[Si_2O_5,Al_2O_2],[Si_2O_5,Al_2(OH)_4]\}$
10 parts of basic blast-furnace slag.

The synthetic alumino-silicate $\{9[Si_2O_5,Al_2O_2],[Si_2O_5,Al_2(OH)_4]\}$ is prepared by calcining kaolinitic material in a rigid (vertical) kiln at 750° C. during 5 hours, to provide an oxide alumino-silicate whose $^{27}Al$ MAS-NMR spectrum shows resonance intensities at 22 ppm and 50 ppm which are 40% higher than the intensity of the secondary resonance at 0 ppm, in relation to $AlCl_3$.

The basic blast-furnace slag contains at least 70% of mellilitic glass, an eutecticum comprising gehlinite and ackermanite. Its $^{27}Al$ MAS-NMR spectrum shows a broad band with a peak at 47 ppm.

A mortar, as in Example 1, is prepared employing the blend of this Example 2. This mortar sets after 30 minutes and has a compressive strength of 19 MPa after 4 hours and 37 MPa after 24 hours, at room temperature.

The hardened mortar has the following Nuclear Magnetic Resonance spectra:

$^{27}Al$ MAS-NMR: resonance at 52 pmm, corresponding to a $(Q_4)(4Si)$-type $(AlO_4)$ tetrahedron, and a resonance at 0 ppm corresponding to Al in VI-fold coordination $(AlO_6)$ in aluminum hydroxide and/or hydrated calcium sulfo-aluminate (ettringite).

$^{29}Si$ MAS-NMR: resonances ranging from −68 to −85 ppm corresponding to the monosilicate $(Q_0)$ and the disilicates $(Q_1)(Q_2)$ and a band ranging from −90 ppm to −100 ppm corresponding to tridimensional framework silicates $(Q_4)$.

EXAMPLE 3

To the powder blend of Example 1 is added 18 parts of vitrified ashes with the following analysis:

| | |
|---|---|
| CaO | 14.92 |
| $SiO_2$ | 52.54 |
| $Fe_2O_3$ | 4.25 |
| $Al_2O_3$ | 18.15 |

| -continued | |
|---|---|
| MgO | 6.80 |
| SO$_3$ | 0.24 |
| TiO$_2$ | 0.89 |
| P$_2$O$_5$ | 0.56 |
| K$_2$O | 0.88 |
| Na$_2$O | 1.05 |

This powder blend has the following Nuclear Magnetic Resonance spectra:

$^{27}$Al MAS-NMR: main resonance at 75 pmm corresponding to a (Q$_0$)(0Si)-type (AlO$_4$) tetrahedron and a resonance with double intensity and a broad peak at 50 ppm ending at 0 ppm.

$^{29}$Si MAS-NMR: main resonance at −77 ppm in relation to TMS, corresponding to a polymerisation degree for the (SiO$_4$) tetrahedron equal to (Q$_0$).

A mortar, as in Example 1, is prepared employing the blend of this Example 3. This mortar sets after 45 minutes and has a compressive strength of 20 MPa after 4 hours and 42 MPa after 24 hours, at room temperature.

The hardened mortar has the following Nuclear Magnetic Resonance spectra:

$^{27}$Al MAS-NMR: resonance at 54 pmm, corresponding to a (Q$_4$)(4Si)-type (AlO$_4$) tetrahedron, and a resonance at 0 ppm corresponding to Al in VI-fold coordination (AlO$_6$) in aluminum hydroxide and/or hydrated calcium sulfo-aluminate (ettringite); the ratio between the intensities of the (Q$_4$)(4Si)-type (AlO$_4$) resonance at 54 ppm and the (AlO$_6$) resonance at 0 ppm, (AlO$_4$)/(AlO$_6$) is equal to 0.32.

$^{29}$Si MAS-NMR: resonances ranging from −68 to −85 ppm corresponding to the monosilicate (Q$_0$) and the disilicates (Q$_1$)(Q$_2$) and a band ranging from −90 ppm to −100 ppm corresponding to tridimensional framework silicates (Q$_4$).

Naturally, various modifications can be introduced to geopolymeric cements and to the method described above, by workers in the field, while remaining within the terms of the invention.

I claim:

1. In a method of manufacturing a hydrated cement for use in an alkali activated concrete, the improvement comprising
   (1) providing a hydrated cement composition consisting essentially of:
   (a) 100 parts by weight of a calcium alumino-silicate of the formula x(CaO).y(Al$_2$O$_3$).(SiO$_2$), where "x" has a value between 2 and 3.5 and "y" has a value between 0 and 0.2;
   (b) 10 to 30 parts by weight of a synthetic alumino-silicate belonging to the class of silicates whose mineralogical structure is lamellar and whose MAS-NMR for $^{27}$Al has at least one main resonance at 20±5 ppm and/or 50±5 ppm in relation to AlCl$_3$;
   (c) 0 to 10 parts by weight of a hydrated disilicate Ca(H$_3$SiO$_4$)$_2$ whose (SiO$_4$) tetrahedron polymerization degree is (Q1) as determined by the value of the MAS-NMR spectrum for $^{29}$Si; and
   (2) subjecting said composition to nuclear magnetic resonance spectroscopy to ensure that the hydrated alumino-silicate has a $^{27}$Al MAS-NMR spectrum not showing a resonance at 66±5 ppm corresponding to a (Q3) (3Si)-type (AlO$_4$) tetrahedron.

2. A method according to claim 1, wherein the said Nuclear Magnetic Resonance $^{27}$Al MAS-NMR spectrum displays essentially a resonance at 55±5 ppm in relation to AlCl$_3$, corresponding to a hydrated alkali alumino-silicate with (Q$_4$)(4Si)-type (AlO$_4$)tetrahedron.

3. A method according to claim 2, wherein, after hydration of the calcium aluminate in excess, the said $^{27}$Al MAS-NMR spectrum shows a resonance at 0±5 ppm in relation to AlCl$_3$, corresponding to Al in VI-fold coordination (AlO$_6$) in aluminum hydroxide and/or hydrated calcium sulfo-aluminate (ettringite), characterized by the ratio (AlO$_4$)(4Si)/(AlO$_6$) between the intensity of the (Q$_4$)(4Si)-type (AlO$_4$) resonance at 55±5 ppm for the said hydrated alkali alumino-silicate and the intensity of the (AlO$_6$) resonance at 0 ppm for the said calcium hydrate, the said ratio (AlO$_4$)(4Si)/(AlO$_6$) is equal to or comprised between 0.1 and 1.

4. A method according to claim 1, wherein one of the said synthetic alumino-silicates is the alumino-silicate oxide {9[Si$_2$O$_5$,Al$_2$O$_2$], [Si$_2$O$_5$,Al$_2$(OH)$_4$]} which is prepared by calcination of a kaolinitic material, to provide an oxide alumino-silicate whose $^{27}$Al MAS-NMR spectrum shows in addition to the main resonances at 20±5 ppm and 50±5 ppm, a secondary resonance at 0±5 ppm with a much lower intensity, in relation to AlCl$_3$.

5. A method according to claim 1, wherein one of the said synthetic alumino-silicates is the calcium alumino-silicate gehlinite 2CaO.Al$_2$O$_3$.SiO$_2$, which is prepared by vitrification of clay material, the said vitrification being carried out in such a way that in the obtained glass, the said calcium alumino-silicate shows a MAS-NMR spectrum for $^{27}$Al with one main resonance at 48 ppm in relation to AlCl$_3$.

6. A method according to claim 5, wherein the said hydrated disilicate Ca(H$_3$SiO$_4$)$_2$ is obtained by alkaline attack of the calcium alumino-silicate of, CaO.Al$_2$O$_3$.SiO$_2$, as determined by analysis of the Ca$_{2p}$/Si$_{2p}$ ratio using X-ray photoelectronic spectroscopy (X.p.s.).

* * * * *